Jan. 9, 1951 W. C. LILLIENDAHL ET AL 2,537,068
MANUFACTURE OF ZIRCONIUM
Filed Nov. 26, 1946 2 Sheets-Sheet 1
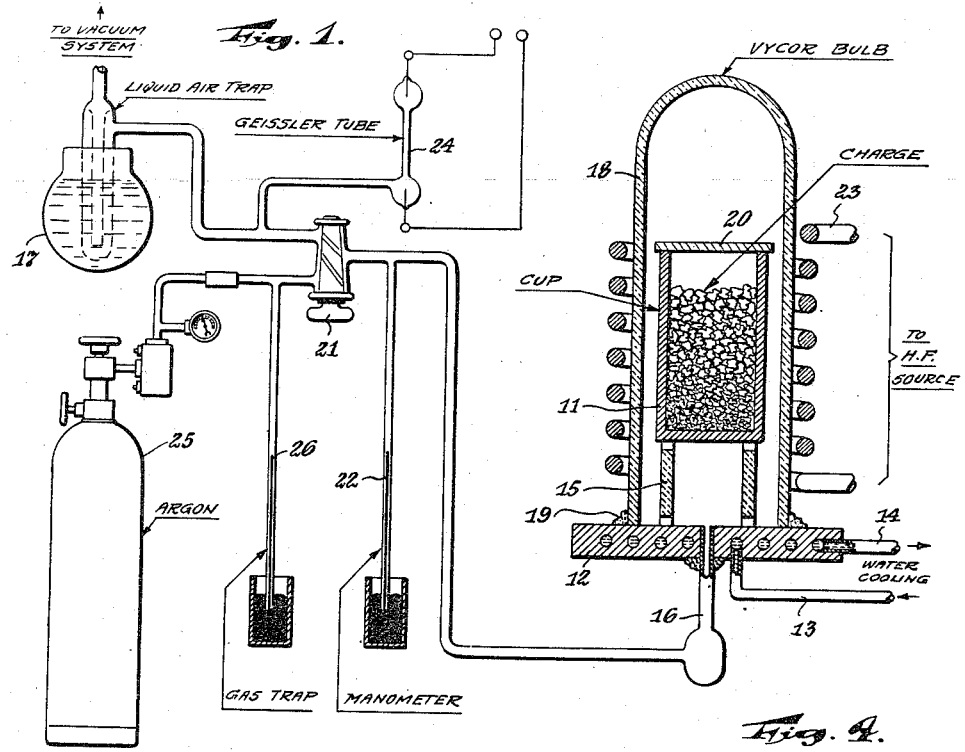
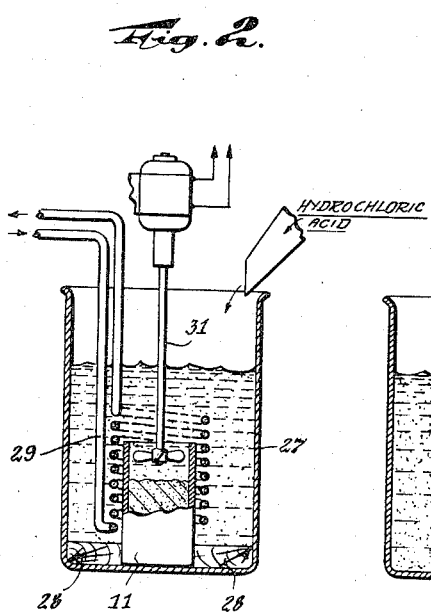
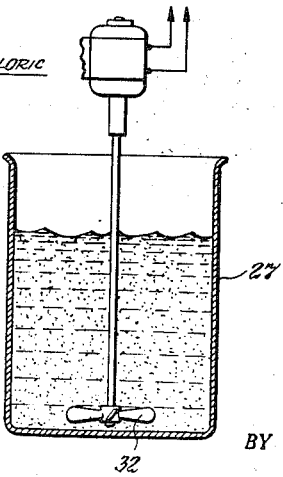
INVENTORS
W. C. LILLIENDAHL
H. C. RENTSCHLER
BY
ATTORNEY

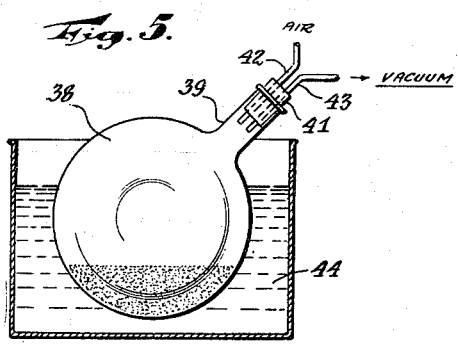
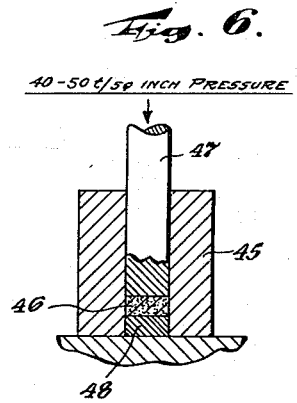
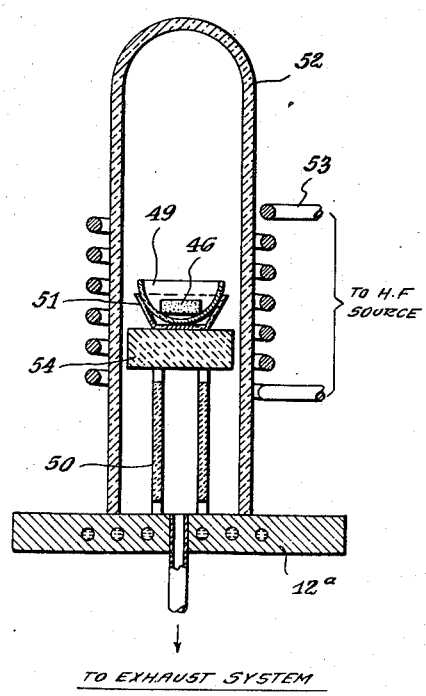
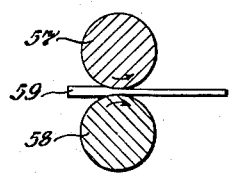
INVENTORS
W. C. LILLIENDAHL
BY H. C. RENTSCHLER
ATTORNEY Patented Jan. 9, 1951

2,537,068

UNITED STATES PATENT OFFICE 2,537,068

MANUFACTURE OF ZIRCONIUM

William C. Lilliendahl, Mountain Lakes, and Harvey C. Rentschler, East Orange, N. J., assignors to Westinghouse Electric Corporation, East Pittsburgh, Pa., a corporation of Pennsylvania Application November 26, 1946, Serial No. 712,408

1 Claim. (Cl. 75—84)

This invention relates to zirconium, more particularly to the production of metal of an exceptionally high degree of purity, and to an improved method for the manufacture thereof.

The principal object of our invention, generally considered, is to produce zirconium by reaction of a compound thereof with calcium, said reaction taking place in a cup enclosed in a container, said container being filled with an inert gas, as distinguished from the prior practice of reducing the oxide in a heavy-walled iron bomb with a ground-in stopper, said bomb being heated in open air.

Another object of our invention is to produce zirconium powder by heating a compound mixed with calcium and calcium chloride by high-frequency induction, the reaction cup being enclosed in a quartz or high-silica glass bell jar, such as one of 96% silica glass.

A further object of our invention is to treat the powder, produced in accordance with the above, to consolidate it into coherent metal and to form to the desired shape.

Other objects and advantages of the invention will become apparent as the description proceeds.

Referring to the drawing:

Fig. 1 is a diagrammatic view, with parts in section, of apparatus for producing zirconium in powder form.

Fig. 2 is a vertical sectional view of apparatus for leaching the contents of the cup used in the reduction of a zirconium compound, to remove the zirconium produced therein.

Fig. 3 is a vertical sectional view of apparatus for washing the zirconium powder produced.

Fig. 4 is an elevational view of apparatus, with parts in vertical section, illustrating how the powder produced may be washed and dried.

Fig. 5 is a vertical sectional view, with parts in elevation, of apparatus for completing the drying of the powder.

Fig. 6 is a vertical sectional view, with a part in elevation, of apparatus for producing slugs from zirconium powder.

Fig. 7 is a vertical sectional view of apparatus for melting a slug of zirconium, such as produced by apparatus shown in the preceding figures.

Fig. 8 is a vertical sectional view of rolls which may be employed for forming the produced zirconium into sheet.

The reduction of rare metal oxides, including zirconia, by calcium or other reducing agents, has previously been accomplished in heavy-walled iron bombs, with a ground-in stopper held in place by a screw cap. Such devices have a number of limitations and disadvantages, to wit:

It is difficult to maintain an air-tight joint between the stopper and bomb and to prevent reoxidation of the zirconium powder produced as the bomb cools, or during the heating process. Considerable warping of the bomb occurs during heating and cooling, thus necessitating time-consuming lapping operations between runs. The construction of bombs has been limited to materials which will resist oxidation at elevated temperatures, and iron or iron alloys have been generally used for economy. Bombs were without exception of heavy-walled construction to permit sufficient surface area for sealing and presumably to withstand pressure produced in the reaction.

From thermo-chemical data and a consideration of the products formed in the reaction between zirconium oxide and calcium, we concluded that the pressures developed in the reaction were insufficient to necessitate the heavy-walled bombs previously used. We tested our conclusions by placing an iron cup under a high-silica glass (or quartz) bell jar, evacuating the bell jar, and then heating the iron cup by high frequency induction to cause the calcium to reduce the zirconium oxide. Vaporization of the calcium was suppressed by filling the jar with argon gas at a pressure slightly less than atmospheric. There was no abnormal pressure produced during the reaction, very little vaporization of calcium, and satisfactory zirconium metal powder was obtained.

The reduction of zirconium oxide by calcium is very old in the prior art. However, the zirconium so produced, when pressed and sintered, resulted in hard and brittle metal compacts. Furthermore, such pressed compacts could not be melted because of puffing and swelling, apparently due to excess calcium. This result has been due to the non-recognition of the importance of controlling both the amount of calcium present and the temperature of the reaction during reduction, as embodied in the present specification, that is, using from 50% to 100% calcium in excess, over the theoretical required in the reaction, together with calcium chloride, to control localized high-temperatures during the reaction.

The invention to be disclosed, therefore, differs from prior practice in the following respects and obviates several limitations of former practice. The heating, reaction, and cooling of the charge is carried out under known, controlled, and reproducible conditions of gas filling and exhaust. The reaction is carried out in a vessel or cup of relatively thin wall. Oxidation of the cup and zirconium produced is entirely prevented by working in an atmosphere free of oxygen. A choice of several materials of construction for the cup may be made, the only limitation being the melting point and chemical activity of the material with zirconium and calcium at elevated temperatures. Thus the cup may be made out of a metal of high melting point, such as molybdenum, which permits the reduction to be made at temperatures at least up to 1400° C. or higher. The use of such temperatures results in an increase in the fluidity of the charge and a faster and more complete reduction.

Specifically, the invention relates to the preparation of nonpyrophoric zirconium powder of a high degree of purity, and to the sintering and melting of such powder into articles of the desired size and shape.

In general, the method involves reduction of a compound of zirconium such as the oxide, or double chloride, i. e. $ZrCl_4 \cdot 2NaCl$ or $ZrCl_4 \cdot 2KCl$, with calcium under controlled conditions of exhaust and gas filling with an inert gas such as argon. After reduction, the metallic zirconium in powder form is recovered by leaching the charge with dilute acid, water, and the powder is finally washed with alcohol, ether, and dried in vacuo. Articles are then formed from the powder by pressing, sintering or melting and machined to the final form desired. The advantages of the method will become apparent as the description proceeds.

The procedure to be described may be applied to eith r the oxide, double chloride, or any relatively non-volatile compound of zirconium, provided that it is reducible by calcium and that the end products of the reaction may be leached or dissolved by acids which will not react with zirconium. In practice we prefer to use the oxide because it is not hygroscopic and has an extremely low vapor pressure at the temperature of the reaction.

In producing zirconium powder, oxides of sufficient purity may be occasionally purchased, although most oxides contain a rather high percentage of silica and are without exception very voluminous. The low density of these oxides reduces to a marked degree the weight of zirconium powder obtained per unit charge. In view of these difficulties, we prefer to resort to special purification methods, although oxides of low apparent density may be converted to those of high apparent density by igniting for from about five to ten hours in air.

We have discovered that a very dense oxide may be prepared by ignition of zirconyl chloride, and the crystallization of this compound serves as an adequate purification step in most cases.

In performing this operation, the starting material may be zirconium tetra chloride, $ZrCl_4$; zirconium nitrate, $Zr(NO_3)_4$; zirconyl chloride, $ZrOCl_2$; or zirconyl nitrate, $ZrO(NO_3)_2$. The nitrate may be dissolved in water and zirconium hydroxide precipitated by ammonia and recovered by filtration. The hydroxide is then dissolved in concentrated hydrochloric acid with the formation of zirconyl chloride. This solution is then evaporated for crystallization of the hydrated zirconyl chloride, $ZrOCl_2 \cdot 8H_2O$. The crystals are filtered off with suction, washed with strong hydrochloric acid, and then ignited to oxide in platinum dishes. It is desirable that the final oxide contain not over 0.05 $SiO_2$, 0.01 Ca, 0.05 Fe, and very small amounts of materials such as titanium, aluminum, and magnesium.

The oxide obtained from one crystallization of crude zirconium chloride, as purchased on the market, showed consistently 0.005% Fe, 0.02% $SiO_2$, 0.008% Ca and spectroscopic amounts of Mg, Al, Ti, Be, Pb, Sn, Cu, and Hf.

In case the first fraction of crystals is not pure enough, the soluble impurities may be further reduced by dissolving the hydrated zirconyl chloride in hot hydrochloric acid and recrystallizing. Silica, if present initially in large amounts, may be reduced by evaporating the zirconyl chloride solution to dryness, heating at 120° C. and then taking up with hot dilute hydrochloric acid followed by filtration.

In copending application, Ser. No. 574,130, filed January 23, 1945, Manufacture of Thorium, now Patent No. 2,446,062, dated July 27, 1948, details are presented for the production of metal powder by mixing thorium oxide and calcium, placing the charge in a molybdenum container, and heating said container to a sufficiently high temperature to cause reduction of the oxide to metal. The heating is with a high-frequency coil, the container is hermetically sealed with a high-silica glass jar closed at one end, and the reduction takes place in an inert gas such as argon und r controlled pressure. The apparatus used for zirconium reduction is identical with that used for thorium, with certain modifications with respect to the charge which will now be discussed.

Attempts to prepare zirconium by the method used for thorium result in a non- pyrophoric powder which is relatively coarse. Powder produced by calcium and zirconium oxide alone analyzed from 0.20% to 1.0% calcium, the calcium content of the metal powder falling off as the excess of calcium over that theoretically required was increased. With as high as 300% excess calcium, metal powder containing 0.2% calcium was obtained.

While the presence of calcium may or may not be objectionable as an impurity, it has an important bearing on the fabrication of special shapes by sintering. This is true since it has been found that the greater part of this calcium is not liberated until temperatures of over 1500° C. are attained. At these temperatures and higher the liberation of calcium causes severe blistering and low density in the treated article. This appears to be due to the high vapor pressure of the calcium and the plasticity of the metal at high temperatures. It is not known at the present time whether this calcium is present in the form of a metallic compound with zirconium, or an oxygen-bearing compound with zirconium.

The reaction between calcium and zirconium oxide is very exothermic, and since increasing the excess calcium in the charge reduced the residual calcium in the powder obtained, it became apparent that the amount of calcium might be controlled by diluting the charge with some inert material which would increase the fluidity of the charge and reduce the formation of localized high temperature centers.

It was found that this could be accomplished by the addition of carefully dehydrated calcium chloride to the charge of oxide and calcium. By diluting the charge in this manner we have been able to produce consistently a nonpyrophoric zirconium powder which contains not more than between 0.05% and 0.09% calcium. This residual amount of calcium has been found to exert no detrimental effect during the sintering process and permits the formation of a dense coherent metal.

In Fig. 1 there is shown apparatus for effecting the reduction of zirconium oxide or other reducible zirconium compounds with relatively-low vapor pressures, such as double chlorides and oxychlorides, to metal. This involves a container, cup or crucible 11 formed of a suitable metal, relatively inert to the charge and zirconium at elevated temperatures, preferably molybdenum, although a molybdenum-lined iron cup, or one formed of iron or steel may be employed. However, if zirconium of a very low iron content is desired, molybdenum or its equivalent must be used. The cup is supported above a metal plate 12 which is preferably cooled by circulating water therethrough by means of inlet pipe 13 and outlet pipe 14. The cup preferably rests on a hollow refractory insulator 15. A mixture of zirconium oxide of high purity, as specified above, and ground to pass a 100 mesh sieve, distilled calcium of highest purity obtainable, cut to pass ⅛″ wire screening, and dehydrated calcium chloride, which should not contain over .5% water, ground to a powder, is placed in the cup. A preferred mixture is 123 gms. of zirconium oxide, $ZrO_2$, 160 gms. of calcium, which represents an excess of approximately 100% over that theoretically required, in accordance with the equation:

$$ZrO_2 + 2Ca \rightarrow Zr + 2CaO$$

and 160 gms. of calcium chloride, dehydrated to leave not more than 0.1% water. This dehydration is necessary because ordinary dehydrated calcium chloride, as purchased, yields variable results. The presence of water vapor plays an important role in increasing the reaction rate, temperature, and residual calcium content of the metal, apparently acting as a catalyst. This proportion is preferred, although satisfactory metal has been produced with between 50% and 300% excess of calcium.

The charge is milled for 30 minutes by tumbling to obtain a good mix and then poured into the reduction container. This may be made of either molybdenum or iron. If iron is not objectionable in the product in the order of 300–400 P. P. M., it is recommended. Otherwise molybdenum containers should be used.

The container 11 is now covered, as by a plate 20 of the same or a suitable metal, and placed under the hermetically sealed high-silica glass bell jar 18. The metal plate 12 is tubulated, as indicated at 16, and connected to a high vacuum exhaust system which may conveniently be comprised of a high vacuum pump, or mercury diffusion pump, and a liquid air trap 17. The 96% silica glass bell jar 18 is just large enough to slip over the cup, and is set on the metal base and sealed vacuum tight, preferably by means of vacuum wax 19, to provide a gas-tight enclosure. The jar is then exhausted to a high vacuum, about 50 microns, through valve or stop cock 21, a Geissler tube 24 serving to indicate the degree of exhaust obtained.

Argon gas (99.7%) is then introduced, as from tank 25 through valve 21 to a pressure of about three-quarters of an atmosphere. A mercury column 22 indicates this pressure. A gas trap or "blow-off" 26, comprising a mercury column, is also provided. The metal cup 11 is then slowly heated by induction to between 1100° and 1200° C. without substantially heating the enclosure and thereby maintaining the gas-tight condition, and maintained at that temperature for about 45 minutes, by energizing a high-frequency coil 23 disposed around the jar to melt the calcium and calcium chloride and reduce the zirconium oxide to metal powder. During this moderate period of heating, small changes in pressure occur and it is advisable to maintain a positive pressure on the bell jar by pumping off sufficient gas from time to time, to hold a final pressure of gas of about three quarters of an atmosphere.

After the cup and charge have thoroughly cooled at the end of the reaction, the cup is removed and placed in a jar or receptacle 27 containing cold water. While in the receptacle 27, the cup 11 is preferably centered, as by means of a block of wood 28, and cooled during the process of leaching as by means of a coil of pipe 29, preferably formed of stainless steel, through which water circulates. Hydrochloric or acetic acid is added at this stage in slight excess over that sufficient to dissolve any calcium and oxide which is leached out of the cup. The mixture is preferably stirred as by means of a stainless steel motor-driven stirrer 31 provided with propeller 32.

After about 30 minutes of leaching in this manner, the cooling coil is removed and the liquid stirred to assist in the solution of calcium and calcium chloride. As soon as the metal powder is out of the cup, or can be removed without difficulty, the container is removed from the solution and, after settling for about one half hour, the supernatant liquid is syphoned off.

The metal powder is then washed with dilute hydrochloric acid, formed by mixing one part of the concentrated acid with ten parts of water by volume, for one hour with constant agitation. After settling until almost clear, the acid is syphoned off and the powder washed in the same way with water, until a sample of the wash liquor shows less than 0.001 gm. of calcium per 100 ml. This generally requires about 6 washes, 5 liters solution per wash for 100 gms. of zirconium powder. It is important that the power be then wet screened to remove material finer than 200 mesh, which probably due to its large relative surface may contain absorbed air or zirconium oxide sufficient to cause loss in ductility and increase in hardness. This treatment decreases the tendency of the powder to be pyrophoric, reduces the brittleness of the sintered metal, and produces a more readily machinable product. After the last wash, the zirconium powder is filtered as in a Buchner funnel 33, illustrated in Fig. 4, using suction as applied to tube 34 of flask 35. A relatively coarse filter paper is preferably used in the funnel, the tubulation 36 of which passes through a cork 37 in the neck of flask 35. The powder is washed with water until the filtrate is clear, and then with alcohol and ether in succession.

The metal powder, after removal from the Buchner funnel, is dried in a spherical flask 38 having a neck 39 receiving a cork 41 through which tubes 42 and 43 pass, one of said tubes being connected to a vacuum pump as illustrated in Fig. 5. Such an arrangement permits the powder to be dried under vacuum conditions. The complete removal of moisture is obtained by immersing the flask with the vacuum on in water 44 at 60° C. to 70° C. and shaking the flask intermittently until such removal is noted by the absence of dusting upon shaking. For larger production a steam jacketed vacuum oven would be used.

Zirconium reduced in molybdenum containers shows about on the average: Mo .01–.05%, Ca .05–.1%, Si .01–.03%, C .02%, with spectroscopic amounts of Ti, Al, Mg, Fe, Ni, Be, Cu, Hf and Mn.

Powder reduced in iron containers will show about on the average: Ca .05–.10%, Si .01–.03%, Fe .03–.04%, C .02%, and Ti .01%. In this range quantity, the iron is probably in solid solution in the zirconium and does not appear to be deleterious for many uses.

Zirconium metal powder prepared as outlined above may be pressed into coherent buttons, rods, strips, or other forms in steel dies under hydraulic pressure, that is by placing in a die and employing a hydraulically actuated plunger to effect the desired consolidation. As an alternative, the powder may be placed in a rubber or other flexible mold, and immersed in a liquid which is subjected to the desired pressure. If the pressure exceeds 20 tons per sq. in., very strong compacts may be produced. Figure 6 illustrates a press 45 in which a quantity of zirconium powder may be pressed into a pellet 46, as by a plunger 47, said powder resting on a plate 48 fitting the lower end of said press 45. Pressures of about 40 to 50 tons per square inch are desirably applied.

Pressed pellets may be transferred to a crucible or cup 49, Fig. 7, for the purpose of sintering or melting in vacuo. The only satisfactory refractory that we have found for melting is thoria ware or thoria powder in a beryllia or other refractory crucible. In practice we have used crucibles 1½" at the top, 1" deep, with the bottom hemispherical. For protection in the event of its cracking, such a crucible is desirably set into an alundum ignition capsule 51, 1¾" diameter by ¾" deep.

In order to obtain the necessary close coupling for heating by high frequency induction, a 96% silica bottle 52 desirably 2½" outside diameter is used, with an appropriate high-frequency coil 53 which fits over the bottle with about ¼" clearance. During the melting operation, the capsule 51, supported crucible 49, and pressed pellet 46, preferably rest on an insulating refractory block 54 supported by a hollow refractory insulator 50 above a metal plate 12ᵃ, corresponding or identical with the plate 12 of Fig. 1, cooled and tubulated as in said first figure. The apparatus for melting may, therefore, be substantially identical with that used for reduction except that the argon line may be omitted.

With the oscillator available, we have been able to melt 30–50 gms. of zirconium in one operation. This amount could be increased by insulation of the crucible containing the charge, or by increasing the size of the oscillator. During the melting operation, the pressed pellet 46 is placed in the crucible 49, as viewed in Fig. 7, and after the chamber 52 has been evacuated to 1 micron or less, the oscillator power is turned on through coil 53. If the powder is low in oxide content, the heating should take place instantaneously. Gas is evolved in the early stages of heating and this is pumped out continuously. During the initial heating the pressure may rise to 100–300 microns which is caused by the liberation of hydrogen in the metal. Pumping is continued until the pressure falls to 1 micron or less and the metal compact melted.

Because of the reactivity of zirconium for such gases as oxygen, nitrogen, and water vapor, we consider it desirable to heat out the pressed slug for melting by placing the coil 53 over the 96% silica jar and gradually raising the temperature to about 400° or 500° C. pumping at not over 5 microns pressure during this heating. This serves to remove occluded gases and water vapor from parts of the treating bottle at temperatures below which these gases would react with zirconium. Beryllia crucibles may be used for melting containing a layer of preignited thoria, upon which the pressed slug is placed. The melts obtained are free of slag and blow holes and the density of the melted material is comparable with that obtained from zirconium made by decomposition of the iodide on a tungsten filament.

When the metal becomes molten, it is held in this condition until quiescent and completely liquid. The oscillator coil is then slowly raised with the current on, and the melt allowed to cool. The coil is raised slowly to reduce the tendency for blow holes to form in the melt during cooling. Some idea of the character of the metal may be obtained by observation of the condition of the melt. The molten metal should appear clear and relatively free from opaque particles. A convenient charge for the crucible and coil, as above described, is from 25 to 50 gms.

Zirconium powder may be sintered into parts of high density by heating in vacuum, helium, or argon up to 1450° C. for from about four to five hours. If in a noble gas, the pressure is preferably slightly in excess of atmospheric. For this operation we have found that high quality porcelain tube furnaces may be used. Pressed bars or other shapes may be placed on a layer of thoria in a molybdenum boat, the whole inserted into the tube furnace. The furnace is then exhausted to a good vacuum and the temperature gradually raised to 1450° C. and held at this point for at least three hours and then slowly cooled to room temperature. If the metal is to be sintered in a noble gas, such as helium or argon, it is preferable that it be first sintered in a high vacuum of about $10^{-3}$ microns or better, to about 1000° C. for about ten to twelve hours to eliminate residual hydrogen and some free calcium. Purified helium or argon is then introduced, desirably to a slight excess of atmospheric pressure, and the temperature then raised to between 1300° and 1450° C. and there maintained for from about four to five hours.

If sintered at 1000° C. in a vacuum, the bars may rest on molybdenum metal, at which temperature no alloying occurs. Satisfactory metal may be produced by such sintering for 12 to 14 hours.

We have also found that zirconium may be sintered to at least 1400° C. in contact with tantalum, as no appreciable alloying was found to occur at such a temperature. Either sintered or melted zirconium shows some cold malleability, toughness, and lack of brittleness usually encountered with such material produced by methods in use other than the iodide process. The material cannot be worked at room temperature but the hardness drops considerably at 300° C. Wire and sheet have been rolled at temperatures between 300° and 400° C. The melted or sintered material is easily machined, drilled and tapped using high speed tools. This fact alone illustrates the strength and toughness of the metal produced and also extends its adaptability to many problems where special shapes are required. We have found that zirconium metal produced by sintering as above described has a Vickers number of 183. If the metal is melted, however, the hardness, increases to a Vickers number of about 287.

Fig. 8 illustrates a pair of rolls 57 and 58 between which a plate 59 of zirconium is being passed in order to reduce the thickness thereof, as in rolling plates of that metal.

Although a preferred embodiment of our invention has been described, it will be understood that modifications may be made within the spirit and scope of the appended claim.

We claim:

The method of producing zirconium powder of an exceedingly high degree of purity, comprising mixing the oxide thereof with about 100% to 300% excess of granulated distilled calcium and about the same weight of dehydrated calcium chloride, placing the mixture in an open cup of high melting point metal, relatively inert to the charge and zirconium at elevated temperatures, supporting said cup, covering said cup with a plate of said metal, surrounding said covered cup with a gastight enclosure to protect it and the zirconium when produced from oxidation and make possible the employment of unusually high reacting temperatures, exhausting said enclosure to a high degree of vacuum, admitting to said enclosure to a predetermined pressure slightly less than atmospheric, a gas inert to the cup and its contents, slowly heating said cup to a temperature between 1100° C. and 1200° C. to melt the calcium and calcium chloride and reduce the zirconium oxide to metal powder and maintaining said cup at said temperature for a period sufficient to effect said reduction, pumping off sufficient gas during said operation to maintain said predetermined pressure in the enclosure, cooling and removing said cup from said enclosure, washing the admixed material from the zirconium powder produced, and drying said powder.

WILLIAM C. LILLIENDAHL.
HARVEY C. RENTSCHLER.

REFERENCES CITED

The following references are of record in the file of this patent:

UNITED STATES PATENTS

| Number | Name | Date |
|---|---|---|
| 1,704,257 | Marden et al. | Mar. 5, 1929 |
| 1,814,719 | Marden et al. | July 14, 1931 |
| 2,205,854 | Kroll | June 25, 1940 |

OTHER REFERENCES

Ztschr. Anorg. Chem., vol. 234, 1937, pgs. 42–50. "Verformbares Titan und Zirkon" by Kroll.

Metal Industry, Oct. 18, 1946, pgs. 319–322. "Titanium and Zirconium, Two Metals of the Future," by Kroll et al.

Bureau of Mines Information Circular, No. I. C. 7341, Feb. 1946. "Survey of Literature on the Metallurgy of Zirconium."